Feb. 12, 1957  R. M. BUCKERIDGE  2,781,456
CABLE REELS FOR A MINE VEHICLE OR THE LIKE
Filed July 15, 1954

INVENTOR.
ROGER M. BUCKERIDGE
BY
ATTORNEY

United States Patent Office 2,781,456
Patented Feb. 12, 1957

2,781,456

CABLE REELS FOR A MINE VEHICLE OR THE LIKE

Roger M. Buckeridge, Downers Grove, Ill., assignor to Goodman Manufacturing Company, Chicago, Ill., a corporation of Illinois Application July 15, 1954, Serial No. 443,576

3 Claims. (Cl. 307—9)

This invention relates generally to vehicles powered from a remote source, and more particularly to an improved cable reel having safety means for preventing the paying off of all the cable therefrom.

Mine shuttle cars of the general type as disclosed in Beck Patent No. 2,633,309 are provided with a cable reel which pays out or reels in the supply cable according to the movement and position of the car relative to a fixed junction supply point. It has sometimes been the practice to paint the first twenty feet or so of cable wound around the reel in a bright color to apprise the operator that he is in danger of completely unwinding the cable from the reel and tearing it from its anchor thereon. Since inadequate illumination in a mine is the usual situation the bright colored portion of the cable may not be seen by the operator in time for him to stop the vehicle.

This invention is characterized by mechanism making it impossible for the vehicle under normal running conditions to go beyond a position where less than a minimum amount of cable is stored on the reel. At such point the main power supply circuit to the vehicle is opened, thus stopping the vehicle, but the operator, by means of a manually controlled switch may move the vehicle a slight amount in either direction, but generally in a direction to wind the cable upon the reel. The main supply circuit is under the conrtol of a switch actuated upon a condition of a minimum amount of cable being wound upon the reel, but when once actuated such switch is preferably arranged to be reset manually by the operator.

With the foregoing considerations in mind, it is a principal object of this invention to provide an automatic device for a shuttle car or the like to prevent the unintended removal of all of the cable from the cable reel of such car.

Other objects and important features of the invention will be apparent from a study of the following specification taken with the drawing which together show a preferred embodiment of the invention and what is now considered to be the best mode of practicing the principles thereof. Other embodiments of the invention may be suggested to those having the benefit of the teachings herein and it is therefore intended that the scope of the invention not be limited by the precise embodiment herein shown, other embodiments being intended to be reserved especially as they fall within the spirit and breadth of the claims appended.

Figure 1:
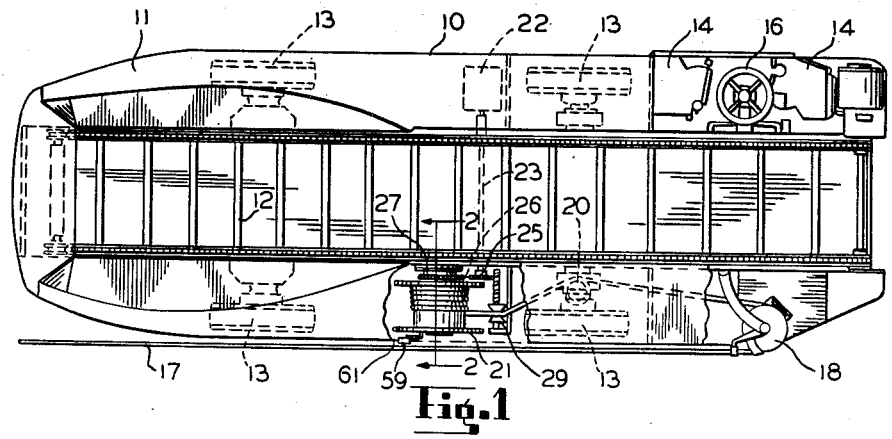
Fig. 1 is a plan view of a mine shuttle car having the improvements according to the present invention embodied therein.
Figures 2, 3:
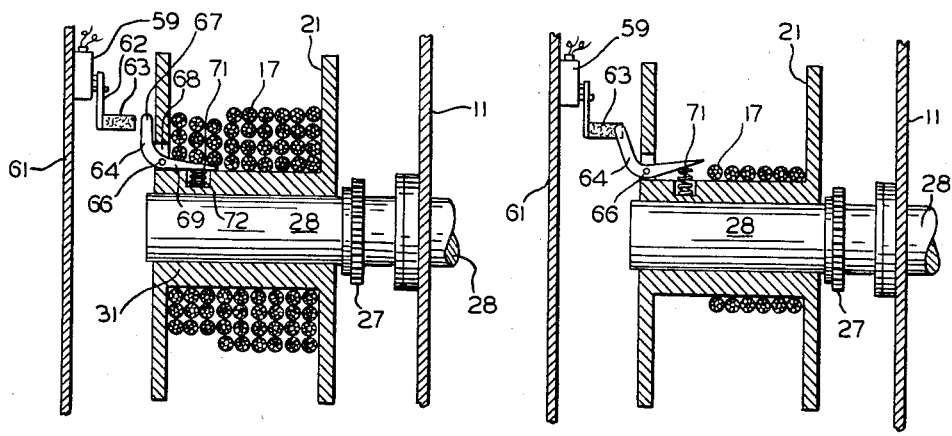
Fig. 2 is a vertical section taken along the line 2—2 of Fig. 1 showing details of construction for the cable reel of such car, and a cable reel anti-over ride switch controlled by the amount of cable on such reel.
Figure 4:
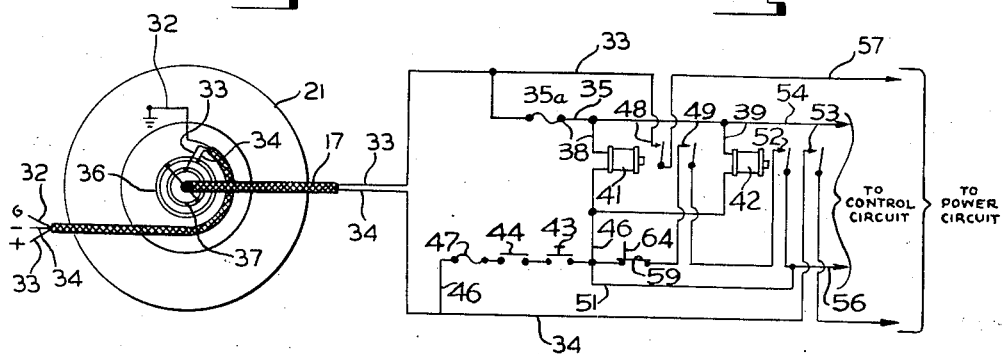

Fig. 3 is a view similar to Fig. 2 but showing a maximum amount of cable payed out by the cable reel, and the over-ride switch operated by reason of the fact that the cable has been payed out from such reels; and Fig. 4 is a schematic circuit diagram showing the power cable connected thereto and control means connected in such circuit and actuated by the presence of a minimum amount of cable stored on the reel.

Referring now to the drawing, there is shown a mine shuttle car 10 which includes a storage bin and frame 11 having a flight conveyor 12 moving longitudinally thereof for storage of material thereon for transport in a mine, and for discharge of material therefrom onto a conveyor or other transporting medium. The shuttle car 10 is provided with front and rear dirigible driving wheels 13 which are under the control of an operator occupying a seat 14, the vehicle being steered by means of a steering wheel 16 whilst the operator occupies either of the seats 14.

Power is supplied to the vehicle 10 by means of a flexible power cable 17 which is guided with respect to the vehicle by a cable guide 18. The power cable 17 is guided over an idler sheave 20, which is supported in any convenient fashion upon the frame 11. The cable 17 is wound upon or payed from a cable reel 21 as the car 10 moves with respect to a fixed junction point supplying power to the drive motors, not shown, of the vehicle 10. The cable reel 21 is powered by a fluid operated or electric drive motor 22 connected by a shaft 23, which in turn drives a sprocket 25 having a cable reel drive chain 26 trained therearound. Said drive chain in turn is connected to a drive sprocket 27 fast upon a shaft 28 supporting the cable reel 21 which also is fast upon the shaft 28.

The cable 17 is arranged to be layer wound upon the cable reel 21, and the layer winding of the cable 17 is achieved by means of a spooler mechanism referred to generally by the reference numeral 29.

The precise details of the construction of the cable reel and the means for driving same forms no part of the present invention and so need not be described in any further detail.

As seen with respect to Figs. 2 and 4, the cable 17 is layer wound upon a hub 31 of the cable reel 21. Such a cable includes a ground connector 32 and power leads 33 and 34, the ground lead 32 being grounded to any convenient metal part of the reel 21. The two power leads 33 and 34 are connected to slip rings 36 and 37, and suitable collector brushes contacting the slip rings are provided so that the power may be transmitted by the power leads 33 and 34 to the circuit seen in Fig. 4.

The two power leads 33 and 34 have connected thereacross a control and starting circuit including a lead 35 branching from the lead 33 and having a fuse 35a connected therein. The lead 35 has connected thereto leads 38 and 39 connected respectively in series with relay starting windings 41 and 42. Both of the relay windings 41 and 42 are connected in series with a starting switch 43 and a safety switch 44 both connected in a lead 46. A fuse 47 is also connected in series with the lead 46 which is then connected back to other power lead 34.

When safety switch 44 is closed, and momentary contact of starting switch 43 is made, the windings 41 and 42 will be energized. When winding 41 is energized it closes a contact 48 connected in series with the power lead 33. When winding 41 is energized it also closes a contact 49 connected in series therewith by means of a lead 51 which is parallel to the line 46.

When winding 42 is energized it simultaneously closes contacts 52 and 53, contact 52 being connected in series with the contact 49, and contact 53 being connected in series with the other power lead 34.

Leads 54 and 56 branch from the power leads 35 and 46 and are connected to the rest of the control circuit for the vehicle 10. Contacts 48 and 53 are connected to leads 57 and 58 connected to the power circuit for the vehicle 10, such power circuit being under the control of control circuits connected to the leads 54 and 56.

A normally closed switch 59 is connected in series with the two contacts 49 and 52, and remains in closed position until the cable wound upon the reel 21 is payed out in excess of a predetermined amount. Switch 59 is mounted upon a side wall 61 of the vehicle 10, and includes a switch actuating arm 62 having a flexible finger 63 extending therefrom, see also Figs. 2 and 3.

The switch 59 is actuated by an actuator 64 in the form of a bell crank as shown in Figs. 2 and 3. Said actuator is pivoted at 66 to the hub 31 of the cable reel 21, and has an arm 67 which protrudes through an opening 68 in one of the sides of the reel 21. The actuator 64 also has an arm 69 extending inwardly along the hub 31 and biased constantly in a counterclockwise direction by means of a spring 71 held within a cylindrical recess 72 formed in the hub 31.

When the reel 21 has stored cable thereon as shown in Fig. 2 the bell crank 64 is operated or held in the position shown to clear the actuating arm 62 and finger 63. When cable has been payed out by the reel 21 until the condition obtains shown in Fig. 3, the spring 71 urges the bell crank 64 in a counterclockwise direction until it strikes the finger 63, thereby actuating switch 59 to the open condition, opening the contacts shown in Fig. 4.

When the contacts 59 of Fig. 4 are opened the circuit through the starting relay windings 41 and 42 is opened, thereby opening the contacts 48, 49, 52 and 53. It will thus be seen that both the power circuit and the control circuit therefor will thus be opened.

The switch 59 is of the manual reset type, and does not automatically close even though the cable is wound back upon the reel 21. In order to effect preliminary rewinding of the cable upon the reel 21, the switch 43 can be closed as described before once more to energize the relays 41 and 42 and their respective contacts 48, 49, 52 and 53. Closing of these last mentioned contacts energizes both the control and power circuits, and the reel 21 may thus be rotated until the bell crank 64 is rocked once more to the position seen in Fig. 2. After the completion of such operation, the switch 59 is reset to give automatic operation of the control circuit described with reference to Fig. 4. Ordinarily, the switch 43 only need be manually operated since the safety switch 44 is ordinarily on. The operator may thus spot the vehicle 10 as desired even though the cable reel anti-over ride switch 59 is opened.

Under the usual conditions of operation, however, when the switch 59 is reset manually and the start switch once actuated, the control circuit is entirely automatic and the switch 43 need not be again actuated, said switch 43 being considered merely a starting switch.

It will be apparent from the description foregoing that a novel and useful arrangement has been provided to prevent the complete unwinding of the cable from the reel, thereby eliminating any possibility of tearing the cable from its point of anchorage at the cable reel hub.

While the invention has been described in terms of a preferred embodiment thereof, it is intended that it be limited only by the claims here appended.

I claim as my invention:

1. In a mine vehicle or the like having a cable reel for a supply cable consisting of a pair of power leads connected to a source of power at a fixed point, a control circuit connected across the power leads of said supply cable for control of power to said vehicle, and means for opening said control circuit when the amount of cable wound upon said reel reaches a minimum value comprising a switch connected in said control circuit, and switch actuating means carried by said reel and comprising a switch actuating arm which is rocked to non-actuating position by winding of cable upon said reel in excess of such minimum amount, and a second switch connected in said control circuit for energizing said control circuit irrespective of the condition of said first named switch.

2. In a mine vehicle or the like having a cable reel for a supply cable consisting of a pair of power leads connected to a source of power at a fixed point, a control circuit connected across the power leads of said supply cable for control of power to said vehicle, and means for opening said control circuit when the amount of cable wound upon said reel reaches a minimum value comprising a switch connected in said control circuit, switch actuating means carried by said reel constructed and arranged to actuate said switch, and a second switch connected in said control circuit for energizing said control circuit irrespective of the condition of said first named switch.

3. In a mine vehicle or the like having a cable reel for a supply cable consisting of a pair of power leads connected to a source of power at a fixed point, a control circuit connected across the power leads of said supply cable for control of power to said vehicle, and means for opening said control circuit when the amount of cable wound upon said reel reaches a minimum value comprising a switch connected in said control circuit, and switch actuating means carried by said reel constructed and arranged to actuate said switch, and a second switch which is manually resettable and connected in said control circuit to maintain same automatically in energized condition after manually resetting of said second named switch.

References Cited in the file of this patent
UNITED STATES PATENTS

| 1,772,548 | Levin | Aug. 12, 1930 |
| 2,069,695 | Brow | Feb. 2, 1937 |
| 2,507,078 | Wright | May 9, 1950 |